(No Model.)
M. M. HARTSOOK.
Hay Press.
No. 232,123.
Patented Sept. 14, 1880.
2 Sheets—Sheet 2.
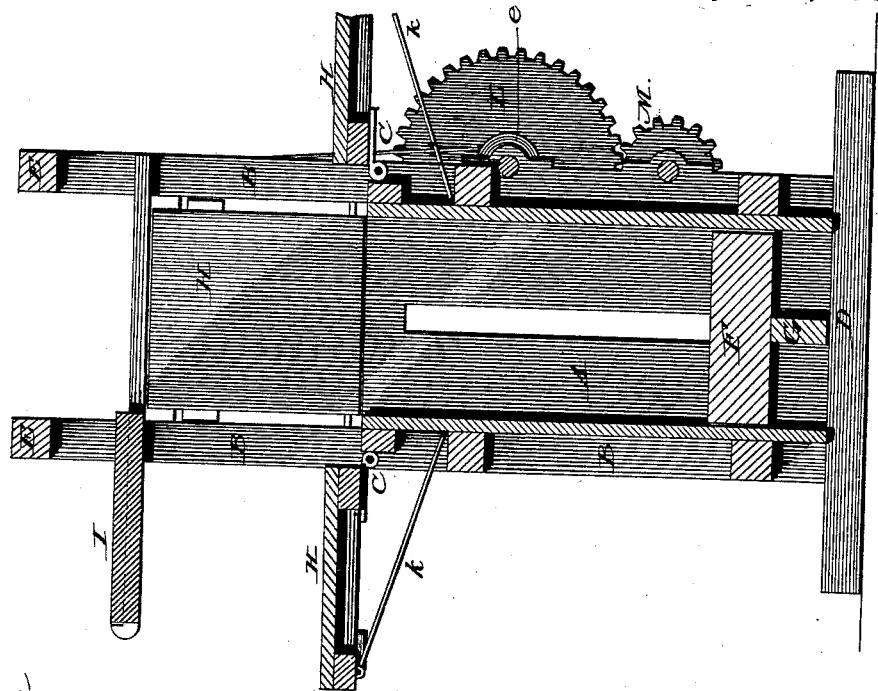
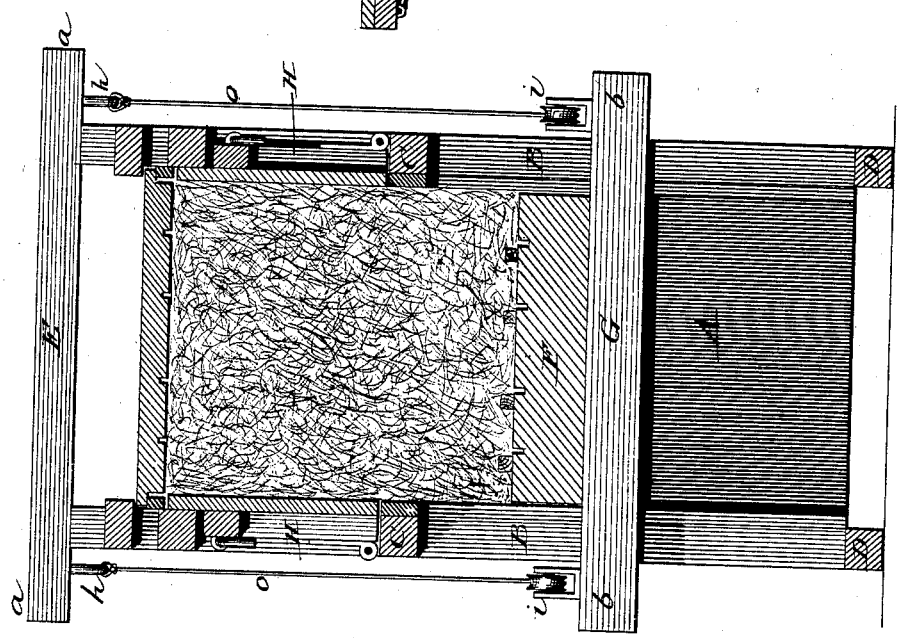
Attest.
Sidney P. Hollingworth
P. R. Stansbury
Inventor.
M. M. Hartsook,
By his Attorneys,
Stansbury & Munn

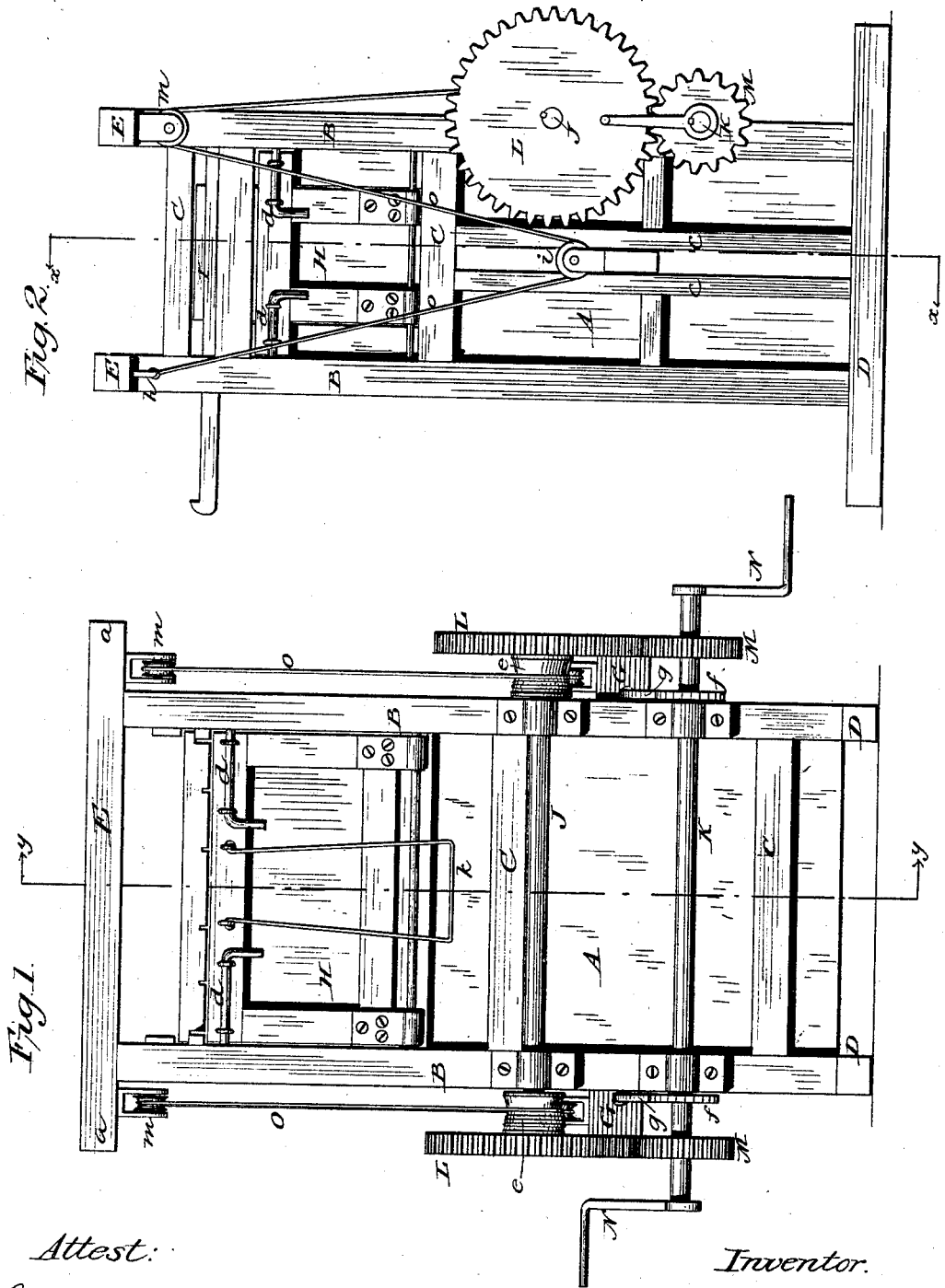

UNITED STATES PATENT OFFICE.

MARIUS M. HARTSOOK, OF NELSON COUNTY, VIRGINIA, ASSIGNOR OF ONE-HALF OF HIS RIGHT TO RICHARD KENNA CAMPBELL.

HAY-PRESS.

SPECIFICATION forming part of Letters Patent No. 232,123, dated September 14, 1880.

Application filed April 23, 1880. (No model.)

*To all whom it may concern:*

Be it known that I, MARIUS MADISON HARTSOOK, of the county of Nelson and State of Virginia, have invented certain new and useful Improvements in Hay-Presses; and I do hereby declare that the following is a full, clear, and exact description of the invention, which will enable others skilled in the art to which it appertains to make and use the same, reference being had to the accompanying drawings, and to letters of reference marked thereon, which form a part of this specification, in which—

Figure 1 is a front elevation; Fig. 2, a side elevation; Fig. 3, a vertical section on the line $x\ x$ of Fig. 2, and Fig. 4 a vertical section on the line $y\ y$ of Fig. 1.

My invention relates to certain improvements in hay-presses; and it consists in combining with the body of a hay-press the downwardly-opening swinging doors, sliding upper platen, follower, and mechanism for operating the press, all constructed and operating substantially as hereinafter more specifically set forth and claimed.

A is the body of the press. It consists of a strong frame made with upright corner posts, B, and cross-pieces C. The corner posts rest upon and are attached to bed-pieces D, and are connected at their upper ends by cross-pieces E, with projecting ends $a$, as shown in Figs. 1 and 3. The lower portion of the frame is made into a receptacle by having its inner sides boarded up. In this receptacle is placed a follower, F, which is attached to a stout timber, G, the ends $b$ of which extend out through upright guides $c$, as shown in Figs. 2 and 3. The upper portion of the frame is provided with four doors, H, one on each side, between the upright posts. These doors are strongly hinged at their lower ends to the cross-pieces C, that are at the upper end of the receptacle in the lower part of the body of the press, so as to swing outward and downward, and to be held in a horizontal position by braces $k$, hinged to them, as shown in Fig. 4. They are also provided with strong sliding bolts $d$, to secure them to the upright posts, as shown in Figs. 1 and 2. When these doors are closed and bolted they form a continuous receptacle in the body of the press.

Between the posts, and just above the upper ends of the doors when closed, a platen, I, is arranged to slide upon suitable guides arranged so as to hold it securely in position when over the body of the press and to support it when moved outward from position, as shown in Figs. 2 and 4.

Two shafts, J and K, are mounted in suitable bearings on the front side of the frame, the upper one, J, being provided at each end with a drum, $e$, and large gear-wheel L, and the lower one, K, with pinion-wheels M, arranged to gear into the wheels L. Shaft K is also provided with ratchet-wheels $f$, with which pawls $g$, attached to the side of the frame, connect, and at either end with cranks N, all as shown in Figs. 1 and 2.

Suitable ropes O, of any kind, one on each side, are attached at one end to staples $h$ in the under side of the projecting ends of the back upper cross-pieces, E, as shown in Figs. 1, 2, and 3. The other ends are passed through pulleys $i$ on the upper sides of the projecting ends of the timber G, and then up through pulleys $m$ on the under sides of the projecting ends of the front cross-pieces, and then down and around the drums $e$, where they are made fast, as shown in the same figures.

The mode of operating this press is as follows: The lower portion is first filled with hay; then the doors are closed and fastened, when more hay can be thrown in, until there is the required amount for making a bale. The cover is then slid into position and power applied to the cranks, winding up the ropes on the drums, thus causing the follower to rise and the hay to be crowded up against the platen and between the doors. This arrangement of gear-wheels in connection with the pulleys, while very simple, has been found to work admirably for the purpose, and by the application of horse or steam power to the cranks any desired pressure can be secured. After the pressure has been applied the front and rear doors are unfastened, turned down, and held in a horizontal position by means of the hinged braces $k$, as shown in Fig. 4. The operators mount upon these doors, pass the cords or wires used for tying through the grooves in the follower and upper platen, and so around the pressed hay, connecting their ends in any desired manner.

As the hay has been forced with great pressure in between the end as well as side doors, its release and removal are made easy by unfastening the end doors after the bale is made, dropping the follower, and sliding back the upper platen.

Having thus described my invention, what I claim is—

In combination with the body A, provided with the downward-swinging doors H, sliding upper platen, I, and follower F, the gear-wheels L and M, ropes O, and pulleys $m$ and $i$, constructed and arranged substantially as herein shown and described.

In testimony that I claim the foregoing as my own I affix my signature in presence of two witnesses.

MARIUS MADISON HARTSOOK.

Witnesses:
  I. H. McFALL,
  E. W. HARTSOOK.